United States Patent
Day et al.

(10) Patent No.: US 10,019,468 B1
(45) Date of Patent: Jul. 10, 2018

(54) SYSTEM AND METHOD FOR DATA INTEGRATION

(71) Applicant: NATIONWIDE MUTUAL INSURANCE COMPANY, Columbus, OH (US)

(72) Inventors: David Day, Gahanna, OH (US); Carey Nash, Worthington, OH (US)

(73) Assignee: Nationwide Mutual Insurance Company, Columbus, OH (US)

(*) Notice: Subject to any disclaimer, the term of this patent is extended or adjusted under 35 U.S.C. 154(b) by 0 days.

(21) Appl. No.: 13/773,701

(22) Filed: Feb. 22, 2013

Related U.S. Application Data

(60) Provisional application No. 61/604,562, filed on Feb. 29, 2012.

(51) Int. Cl.
*G06F 17/00* (2006.01)
*G06F 17/30* (2006.01)

(52) U.S. Cl.
CPC .............. *G06F 17/30312* (2013.01)

(58) Field of Classification Search
CPC ......... G06F 17/30569; G06F 17/30067; G06F 17/30286; G06F 17/30312
USPC ....................................... 707/756
See application file for complete search history.

(56) References Cited

U.S. PATENT DOCUMENTS

| | | | |
|---|---|---|---|
| 7,353,197 B2* | 4/2008 | Callan | G06Q 40/00 705/35 |
| 7,761,406 B2* | 7/2010 | Harken | 707/602 |
| 7,805,341 B2* | 9/2010 | Stromquist et al. | 705/30 |
| 7,975,247 B2* | 7/2011 | Anantharaman et al. | 716/100 |
| 2003/0028545 A1* | 2/2003 | Wang et al. | 707/100 |
| 2009/0100165 A1* | 4/2009 | Wesley, Sr. | G06F 15/173 709/223 |
| 2012/0004903 A1* | 1/2012 | Pillai et al. | 704/9 |
| 2012/0095973 A1* | 4/2012 | Kehoe | G06F 8/70 707/694 |

* cited by examiner

*Primary Examiner* — Tuan A Pham
*Assistant Examiner* — Thai V Dang
(74) *Attorney, Agent, or Firm* — Morgan Lewis & Bockius LLP

(57) ABSTRACT

Methods and systems for processing and integrating data. A data file containing data describing a source transaction, associated with an identifier, is received. A type of the source transaction is identified based on a key indicator associated with the data file. The data contained in the data file is mapped to an object model based on the type of the source transaction identified. Output transaction objects are created by processing the data contained in the data file, mapped to the object model, using business rules. The business rules are selected based on a type of the object model. The output transaction objects are received and matched to the source transaction. A target system to receive the output transaction objects is identified based on the identifier associated with the data file.

9 Claims, 13 Drawing Sheets

US 10,019,468 B1

SYSTEM AND METHOD FOR DATA INTEGRATION

CROSS REFERENCE TO RELATED APPLICATIONS

This application claims priority to U.S. Provisional Patent Application No. 61/604,562, filed Feb. 29, 2012, the entirety of which is incorporated herein by reference.

FIELD OF THE INVENTION

The systems and methods described herein relate to processing data associated with a transaction in accordance with business rules and transmitting the transactions resulting from the processing to a target system.

SUMMARY OF EMBODIMENTS OF THE INVENTION

The present invention is directed to systems, methods and computer-readable media for use in connection with processing transaction data in accordance with business rules. A data file containing data describing a source transaction, and associated with an identifier, is received. A type of the source transaction is identified based on a key indicator associated with the data file. The data contained in the data file is mapped to an object model based on the type of the source transaction identified. Output transaction objects are created by processing the data contained in the data file, mapped to the object model, using business rules. The business rules are selected based on a type of the object model. The output transaction objects are received and matched to the source transaction. A target system to receive the output transaction objects is identified based on the identifier associated with the data file.

BRIEF DESCRIPTION OF THE DRAWINGS

The foregoing summary, as well as the following detailed description of various embodiments, will be better understood when read in conjunction with the appended drawings. It should be understood, however, that the invention is not limited to the precise arrangements and instrumentalities shown.

In the drawings.

DETAILED DESCRIPTION

Figure 1:
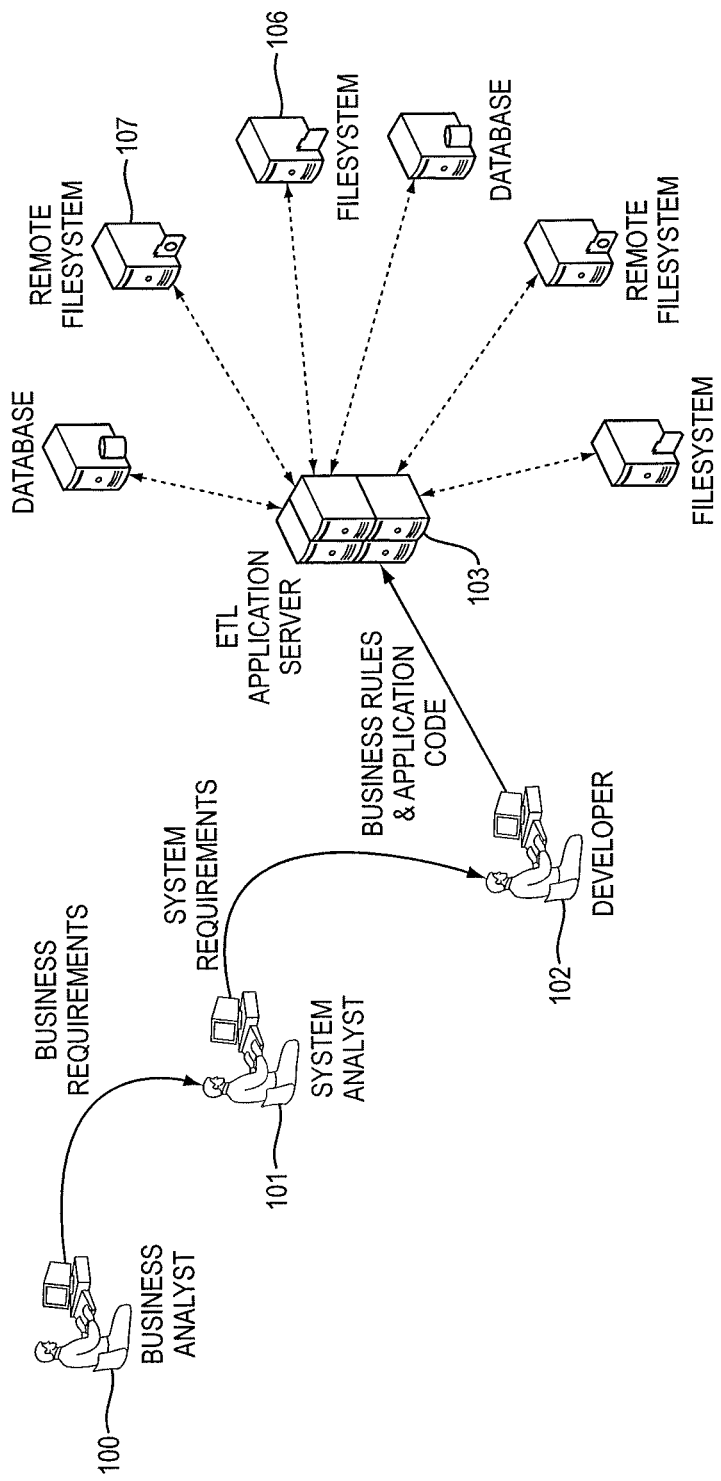
FIG. 1 illustrates a system reflecting an Extract-Transform-Load Development environment.

With reference to FIG. 1, in a typical Extract-Transform-Load (ETL) Development environment, business rules (i.e., processing directives not based on strict, well-known algorithms but derived from how an entity chooses to do business) and data processing code are intermingled. Changes to business rules are only made through a standard Software Development Lifecycle (SDLC) in which the Business Analyst or Rule Owner (e.g., Business Analyst 100 of FIG. 1) has no direct control over the rules for which they are responsible. Rule changes must pass from the Business Analyst 100 to the System Analyst 101 for review and then, finally, to the Developer 102 who implements the changes directly in the ETL code (i.e., which is maintained in ETL Application Server 103). This process can be lengthy and time consuming.

Figure 2:
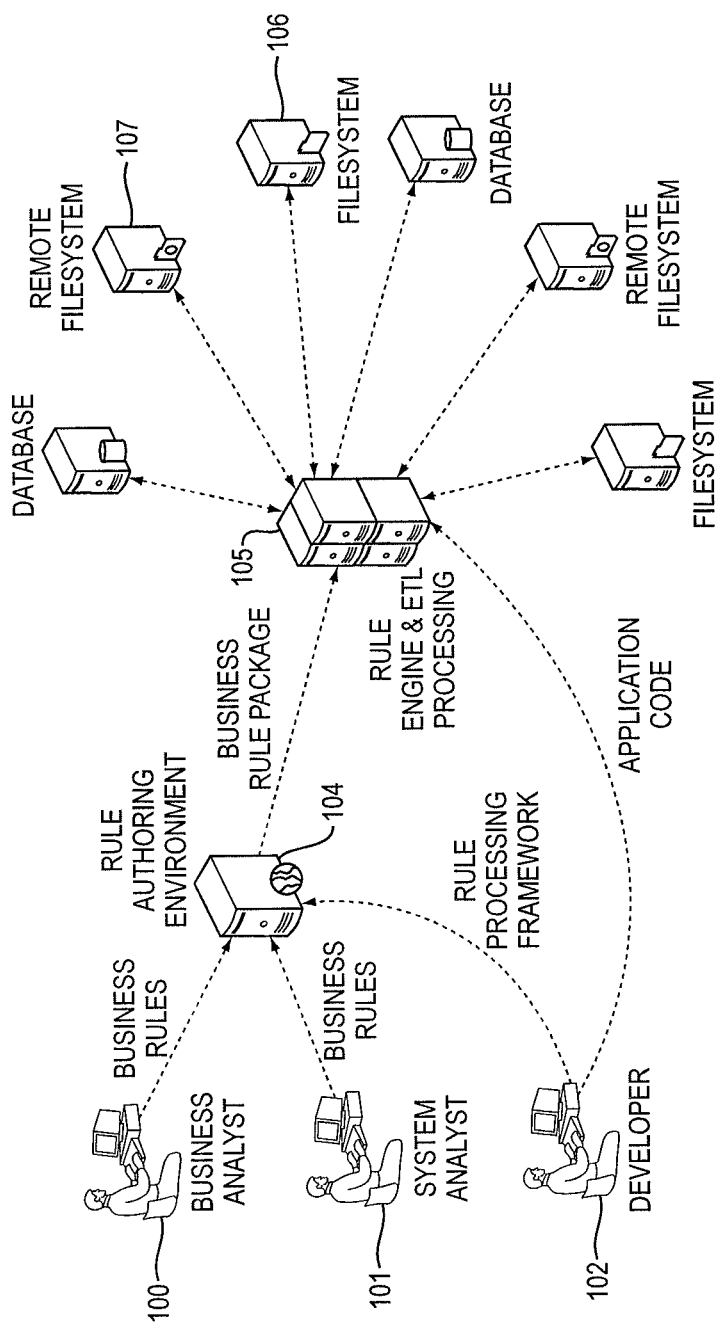
FIG. 2 illustrates an exemplary system reflecting a Business Rules Engine-based ETL Development environment in accordance with one embodiment of the present invention.

With reference to FIG. 2, use of the Business Rules Engine-based ETL Development systems and processes described herein allow for rule changes to be made directly by those accountable for the rules. The Developer 102 creates a rule framework in the Rule Authoring Environment 104 (and, more specifically, the Business Rules Management System (BRMS) 302 of FIG. 3), where rules are authored. This framework contains high-level data models and the semantics in which rules are written. The Developer 102 is also responsible for maintaining the code within the Source Integrator 301 (FIG. 3), which contains only the logic necessary to move data from one system to another, passing data to the Business Rules Engine (BRE) 303 for transformation via the business-authored rules.

The Business and System Analysts are responsible for creating and testing rules in the BRMS 302, authorizing rules for deployment, and deploying rules from the BRMS 302 to the BRE 303, where rules are made available to the live system 105 for ETL processes. This process is managed outside the SDLC in its own Rule Development Lifecycle (RDLC). In this model, the rule changes are managed separately from the application code. This lifecycle has a much quicker response time, allowing rule changes to go from creation to implementation in a much shorter time frame (e.g., a single day), without the need for software developers or other costly IT resources. The SDLC still exists to manage application code changes, but is used less frequently and is limited to application code changes that are unrelated to changes in business logic.

As described with reference to FIG. 1, a typical ETL environment has two major components: the ETL Development Environment and the ETL Processing Engine. The ETL Development Environment is where the Developer 102 implements both business-rule data transformations and system-to-system integration. The ETL Processing Engine 103 is responsible for the execution of both the data transformations and system integrations. A typical process would involve pulling in a dataset from a source system (e.g., a database, remote file system or file system), manipulate the data based on code written by the developer 102 to potentially map values from one form to another (e.g., change states from their long name, such as Ohio, to a short form, such as OH) or apply business logic (e.g., calculate taxes or assign a transaction to a reporting region), then send the resulting data to a target system (e.g., a database, remote file system or file system).

The BRE-based ETL development process, described with reference to FIGS. 2 and 3, has three major components, in the exemplary embodiment: the BRMS 302, the BRE 303, and the Source Integrator 301. Business analysts 100 (e.g., User 300) author business rules (such as calculating tax values, assigning transactions to reporting regions, or translating values from one form to another) in the BRMS 302. BRMS 302 allows for authoring of business rules, manages the rule development lifecycle, and deploys the business rules to BRE 303. BRMS 302 is responsible for authenticating and authorizing individuals who need to interact with business rules.

Once these business users have tested and approved their rules, they deploy the rules to the BRE 303 where they are then available for execution during data processing. The BRE 303 provides the business rules as a service and processes data it receives from the Source Integrator 301 against the business rules. BRE 303 is responsible for authenticating and authorizing individuals who need to administer or deploy business rules.

Source Integrator 301 is responsible for receiving financial data from the various source systems throughout the enterprise and creating data that is then sent out to the various target information technology systems. The Source Integrator 301 is programmed to extract or receive data from a source system, pass it to the BRE 303 for data transformation, receive transformed results from the BRE 303, then send to or update a target system with those same results. The Source Integrator 301 is the tying component, allowing for the application of, potentially, highly volatile and business-owned rules to batch ETL processes without the need for involvement of Developer 102. Thus, the Source Integrator 301 standardizes the source data it receives, sends it to the BRE 303 for processing in accordance with business rules, generates transactions (e.g., one or more output transactions, which include payload data) based on the data it receives back from the BRE 303 after processing, validates those transactions, distributes the transactions back to a database/system, and manages source integration errors. Source Integrator 301 is also responsible for authenticating and authorizing individuals who need to administer source integration processes.

Reference Data Repository 306 is used by BRE 303 to validate values of common attributes (e.g., it holds a master list of values for things such as, in the exemplary insurance accounting embodiment, General Ledger Account, Territory, Product). Source system 304 is representative of one or more source systems that manage events or are other types of systems that process transactions from which Source Integrator 301 receives data relating to transactions. Target system 305 is representative of one or more target systems that receive data after being processed in accordance with business rules.

Certain of the exemplary embodiments described herein, including some of the diagrams and examples, relate to business events that trigger accounting transactions. However, it is noted that the invention is not so limited and is applicable in any context in which transactional data generated by an organization is to be processed in accordance with business rules.

Figure 4:
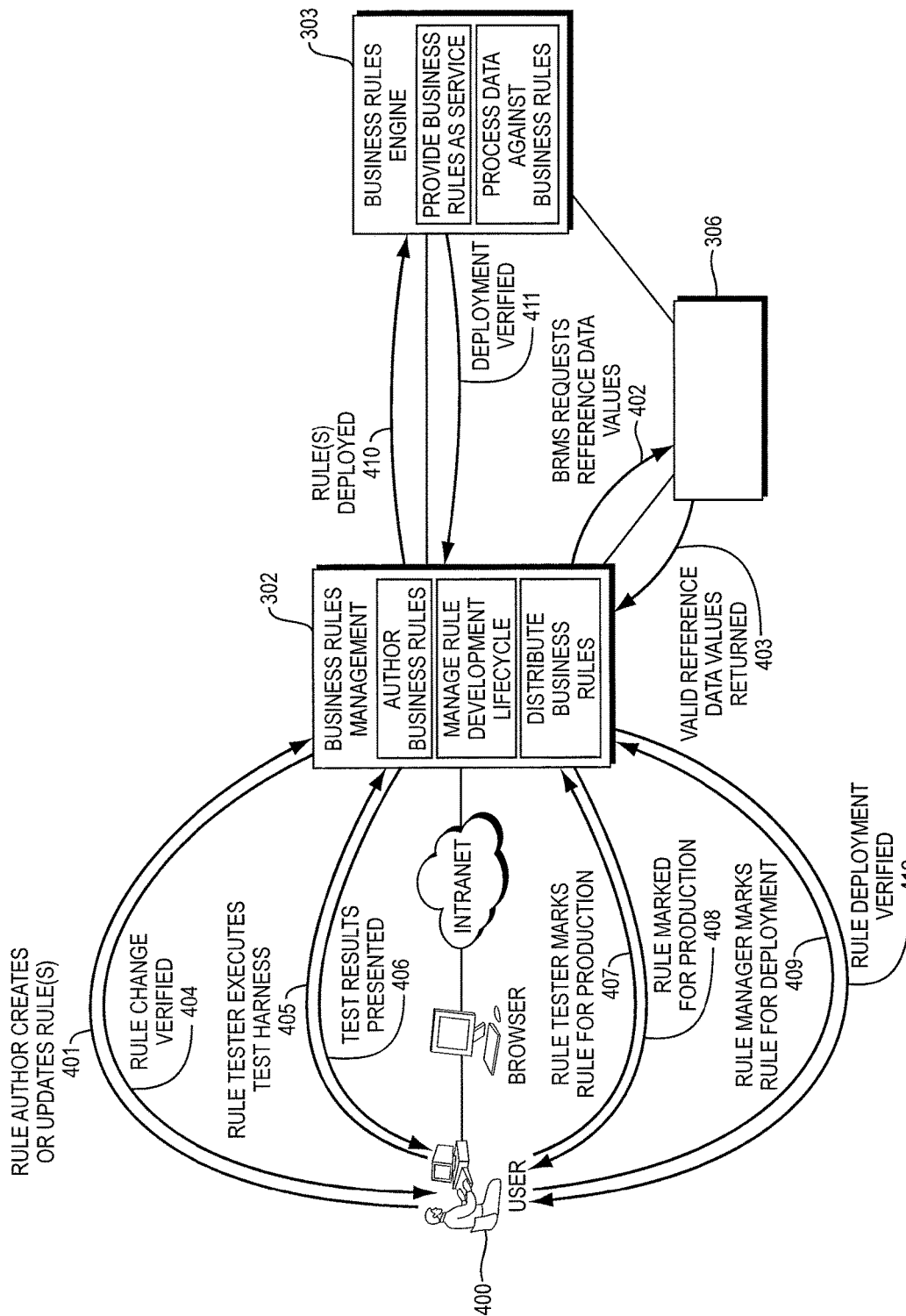
FIGS. 4 and 5 illustrate an exemplary flow of information among certain of the system components illustrated in FIG. 3.

FIG. 4 is a flow diagram illustrating steps of the rule creation and deployment process in accordance with one embodiment of the invention. Rule author 400 (Business Analyst 100) creates or updates rules in step 401, using BRMS 302. In step 402, BRMS 302 requests reference data values from Reference Data Repository 306. This ensures that rules are written using valid values of common attributes. In one embodiment, reference data values in rules are validated as they are written and again in the transactions as they are processed. In step 403, valid reference data values are returned. In step 404, the new rule or rule change is verified by BRMS 302 back to the rule author. In step 405, the rule tester executes a test for the rule. In step 406, the test results are presented back to the rule tester by BRMS 302. In step 407, the rule tester marks the rule for production. In step 408, BRMS 302 confirms that the rule is marked for production. In step 409, the rule manager marks the rule for deployment. In step 410, the rule is deployed by BRMS 302 to BRE 303, which verifies deployment back to BRMS 302 in step 411. In step 412, the rule deployment is verified back to the rule manager. Thus, BRMS 302 is instrumental in allowing for the authoring of business rules, managing the rule development lifecycle, and distributing business rules. BRE 303 is instrumental in providing the business rules as a service and processing data against the business rules.

Figure 5:
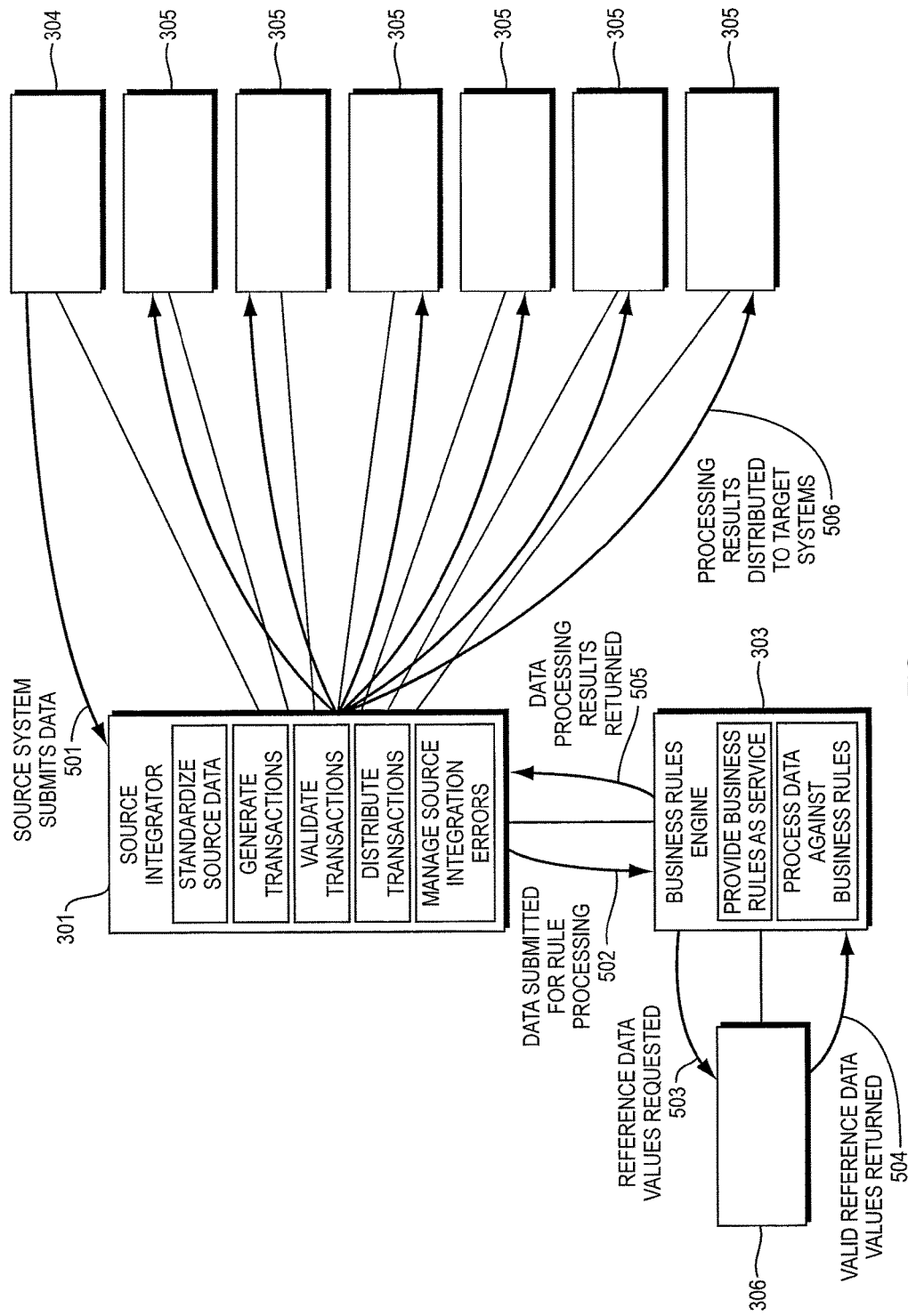

Referring to FIG. 5, the functionality of the Source Integrator 301 is now described in further detail. In step 501, a source system 304 submits data to the Source Integrator 301. In step 502, the data is submitted by the Source Integrator 301 to the BRE 303 for rule processing. In step 503, reference data values are requested from Reference Data Repository 306. In step 504, valid reference data values are returned. After BRE 303 processes the data against the business rules, in step 505, the data processing results are returned to the Source Integrator 301. In step 506, the Source Integrator 301 then distributes the processed data to the appropriate target system(s) 305. Thus, the Source Integrator 301 is instrumental in standardizing source data, generating transactions, validating transactions, distributing transactions and managing source integration errors.

Figure 3:
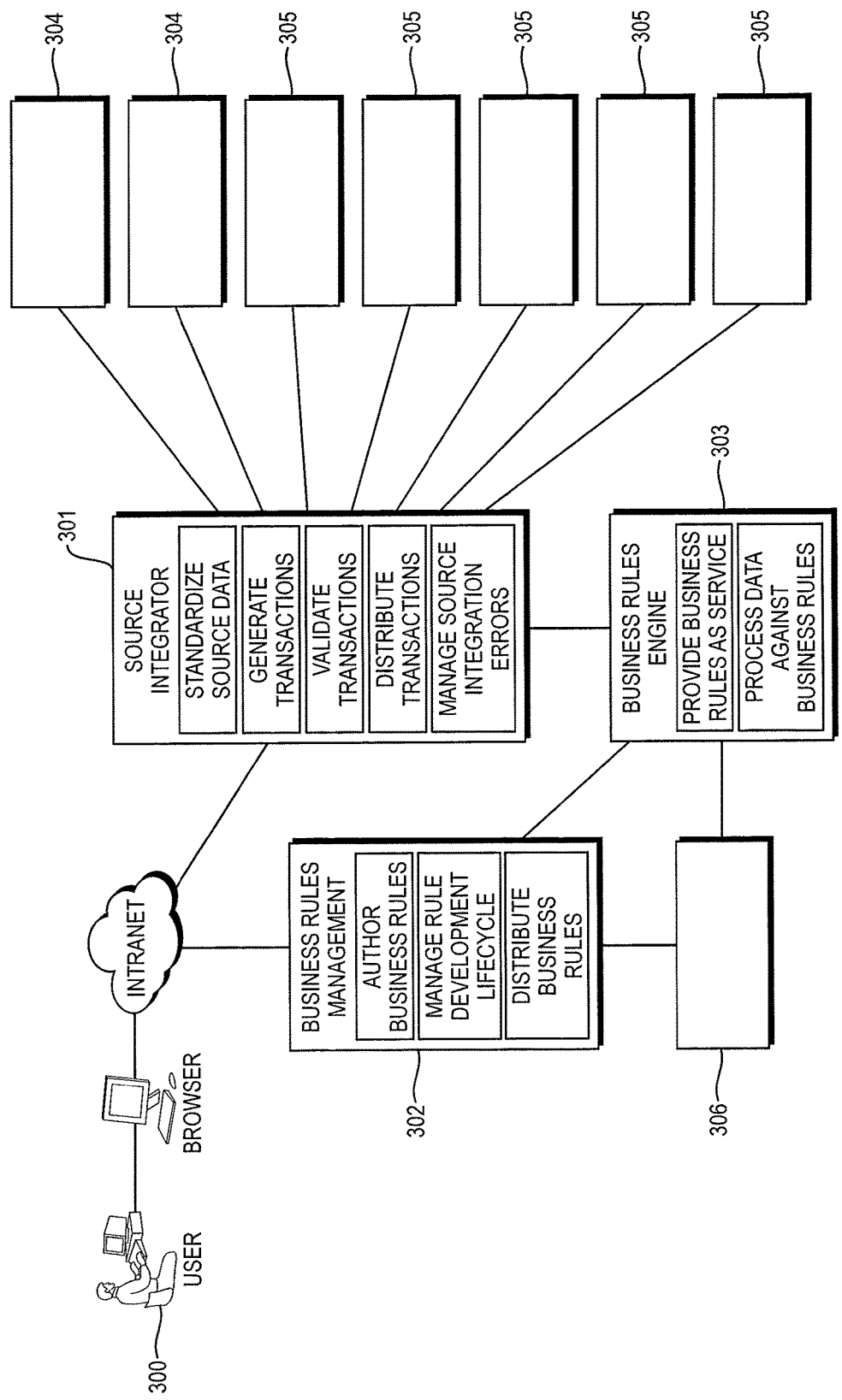
FIG. 3 illustrates an exemplary system that may be used in connection with one embodiment of the present invention.
Figure 6:
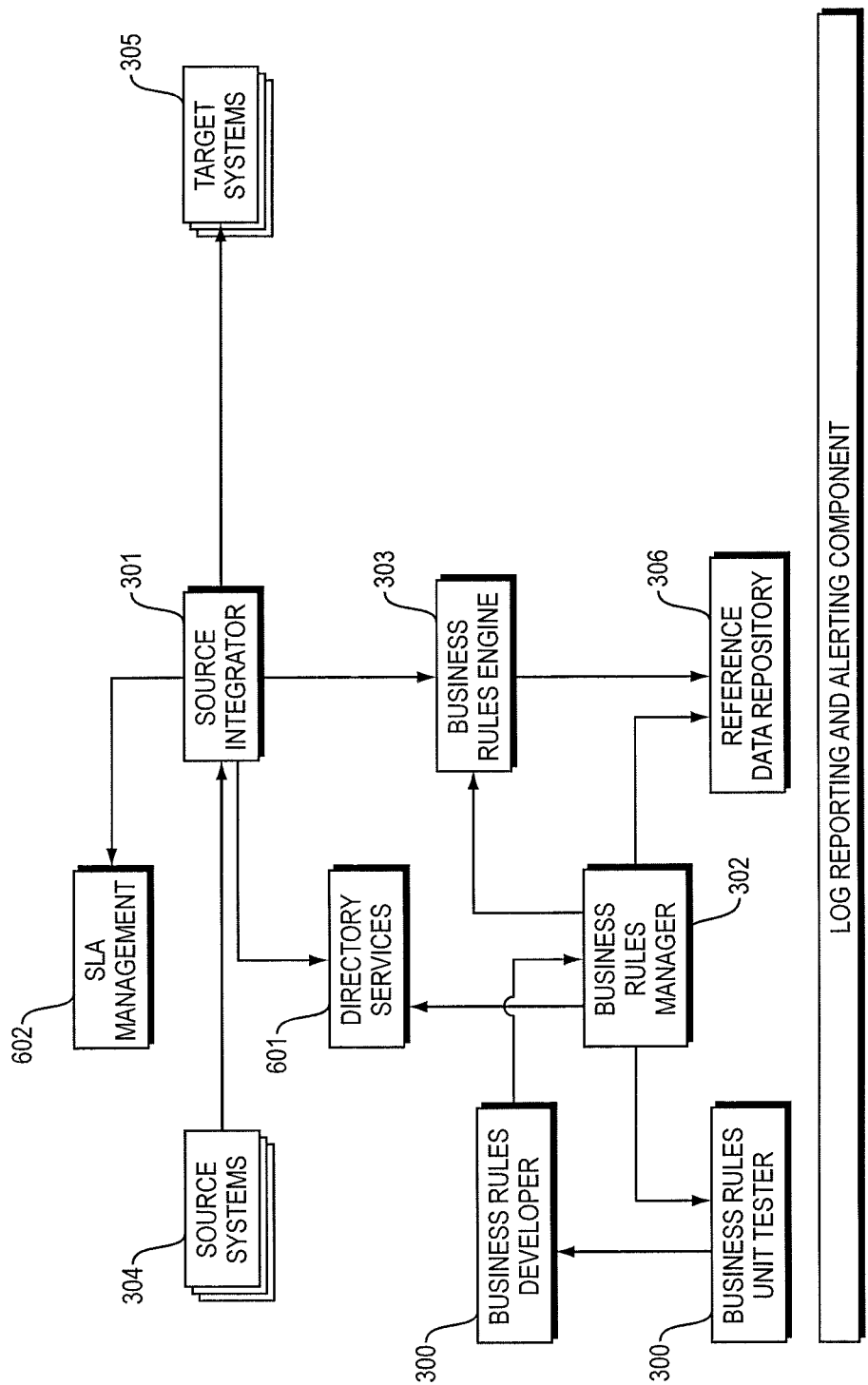
FIG. 6 is a conceptual component diagram illustrating certain subsystems used in connection with an embodiment of the present invention.

FIG. 6 is a conceptual component diagram of the subsystems described in FIG. 3. Directory services 601 is the component responsible for user authentication. SLA (i.e., Service Level Agreement) management component 602 is a component responsible for ensuring source systems deliver data to the system by pre-arranged deadlines.

Figure 7:
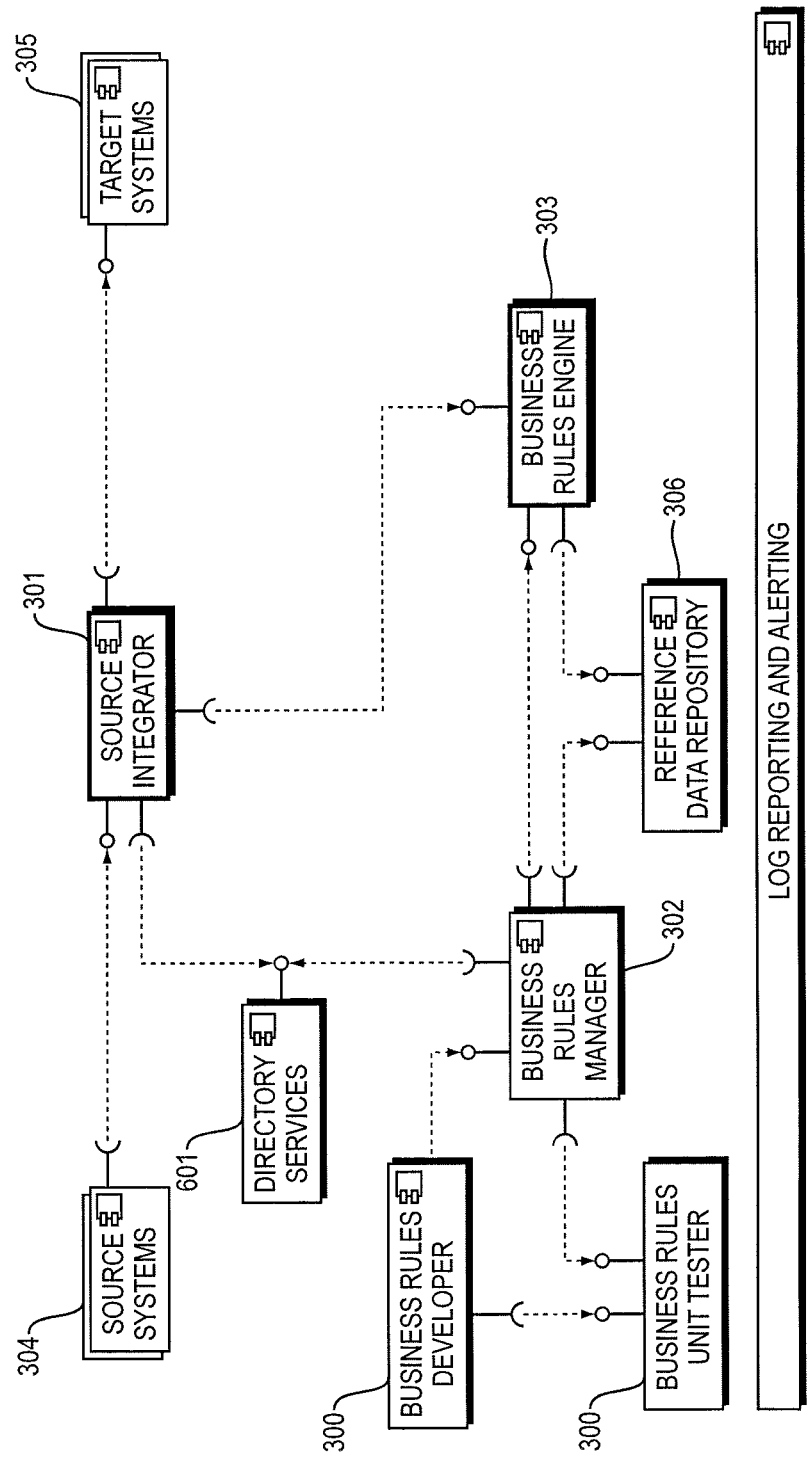
FIG. 7 is a logical component diagram illustrating certain subsystems used in connection with an embodiment of the present invention.

FIG. 7 is a logical component diagram of the subsystems described in FIG. 3.

Figure 8:
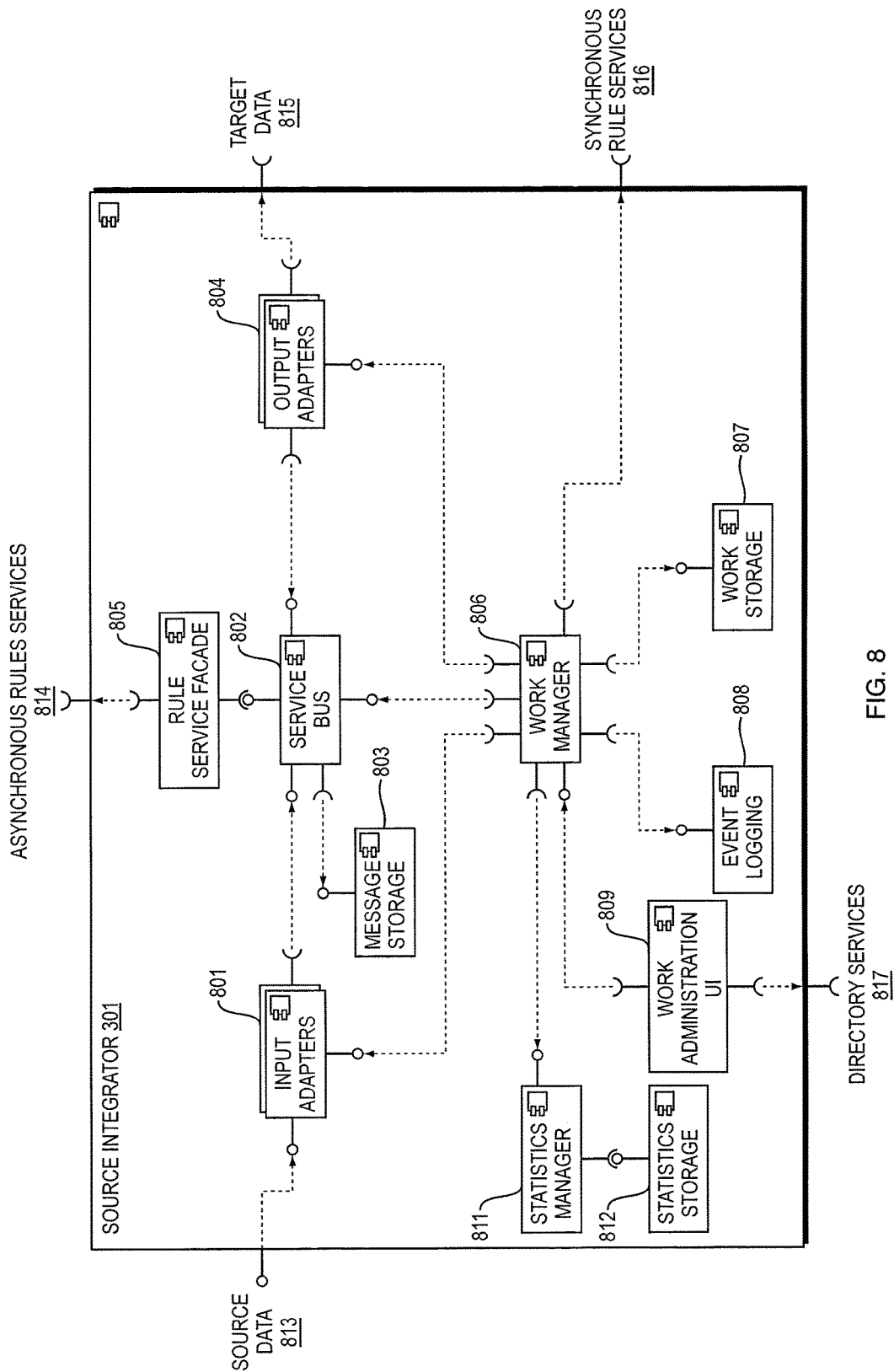
FIG. 8 is a logical component diagram of one of the subsystems used in connection with an embodiment of the present invention.

FIG. 8 is a logical component diagram of the Source Integrator 301. The services provided by each of the logical components are described as follows. Input adapter components 801 are components that handle mapping received data (files, messages, etc) to internal representations. The external services provided include mapping external data structure to internal representations. Service bus component 802 is a component that mediates services among the other components by message queues. The external services provided include sending and retrieving messages. The message storage component 803 is responsible for persisting service bus 802 messages. The external services provided include storing messages. The output adapter components 804 are components that handle generating external output data (files, messages, etc) from internal representations. The external services provided include mapping internal representations to external data structures. The rule service façade component 805 is a component that is responsible for providing the other components a generic interface to the BRE 303. The external services provided include executing business rules. The work manager component 806 is responsible for coordinating the work of the other components. The external services provided include providing work configuration, routing work, suspending work, cancelling work, providing work status, and providing events. The work storage component 807 is responsible for persisting work related information for the work manager component 806. The external services provided include storing work configuration information and storing work in progress. The event logging component 808 is responsible for routing events to external storage. The external services provided include logging events. The work administration user interface component 809 is responsible for providing a user interface for work configuration. The external services provided include creating work configuration information, retrieving work configuration information, updating work configuration information, and deleting work configuration information. The statistics manager component 811 is responsible for coordinating work statistics for the work manager component 806. The statistics storage component 812 is responsible for persisting statistical information for the statistics manager component 811. The statistics components are components that track such aspects of the system as how many records were processed in a batch, how long a batch process took, and how long it took to execute rules appropriately, by way of example.

Figure 9:
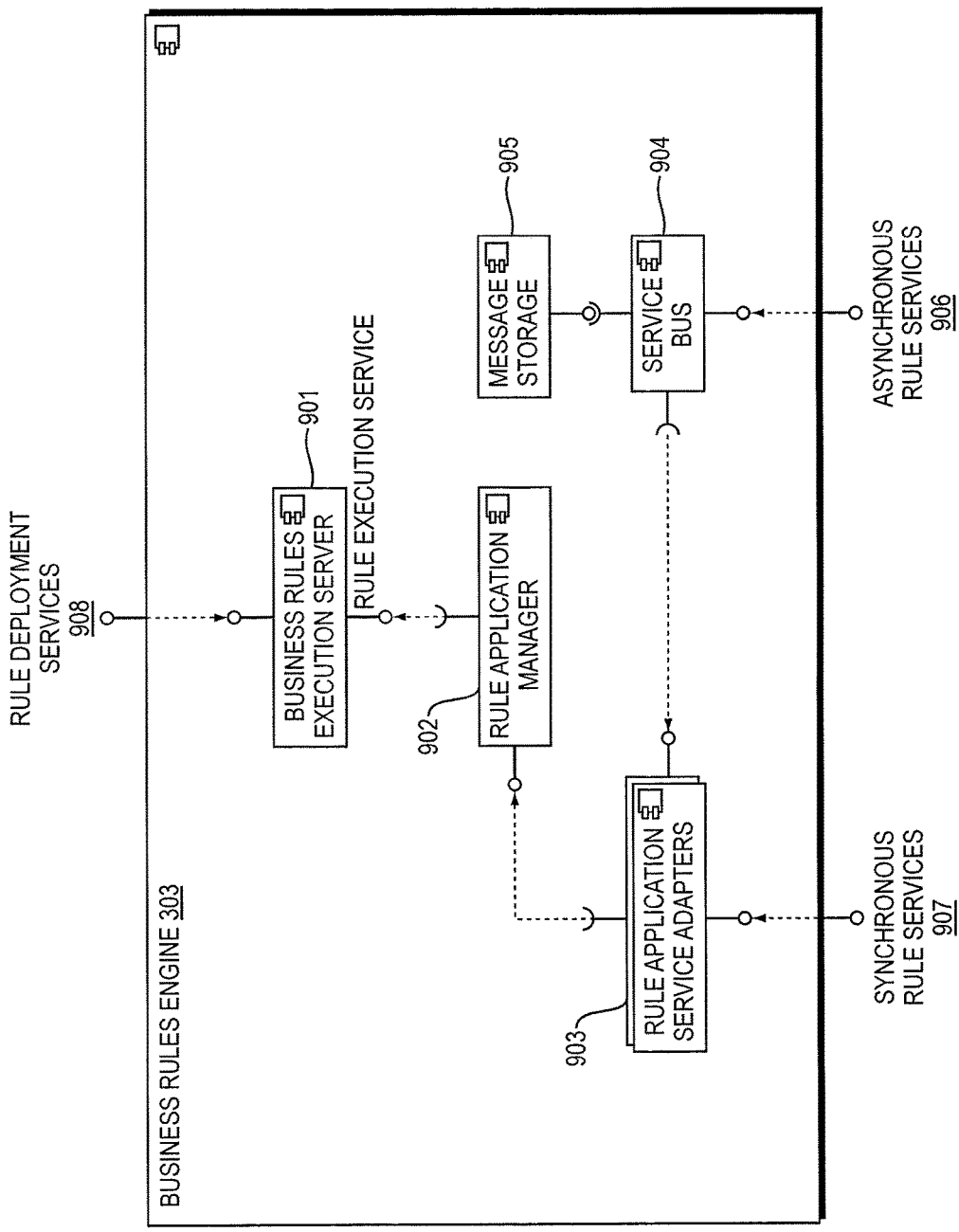
FIG. 9 is a logical component diagram of another of the subsystems used in connection with an embodiment of the present invention.

With further reference to FIG. 8, the component interfaces are now described. The source data interface 813 provides transaction information from source systems 304. The asynchronous rule services interface 814 provides asynchronous invocation of business rules. The target data interface 815 provides transaction information (e.g., standard enterprise accounting transaction information). The synchronous rule services interface 816 provides synchronous invocation of business rules. The directory services interface 817 provides information for authenticating users FIG. 9 is a logical component diagram of the BRE 303. Business rule execution server component 901 is responsible for executing business rules. Rule application manager component 902 is responsible for managing execution of the rule application manager component 902 against a set of data. The external services provided include processing rule application requests and providing process results. The rule application service adapters component 903 is responsible for matching incoming synchronous service requests to the rule application manager component 902. The external services provided include receiving synchronous requests and matching requests to rule applications. Service bus component 904 is responsible for managing asynchronous service requests via message queues. The external services provided include sending messages and retrieving messages. The message storage component 905 is responsible for persisting messages for the service bus component 904.

Continuing with reference to FIG. 9, the logical component interfaces are now described. Asynchronous rule services interface 906 provides for asynchronous invocation of business rules. Synchronous rule services interface 907 provides for synchronous invocation of business rules. Rule deployment services interface 908 provides a method for deploying and managing business rules.

Figure 10:
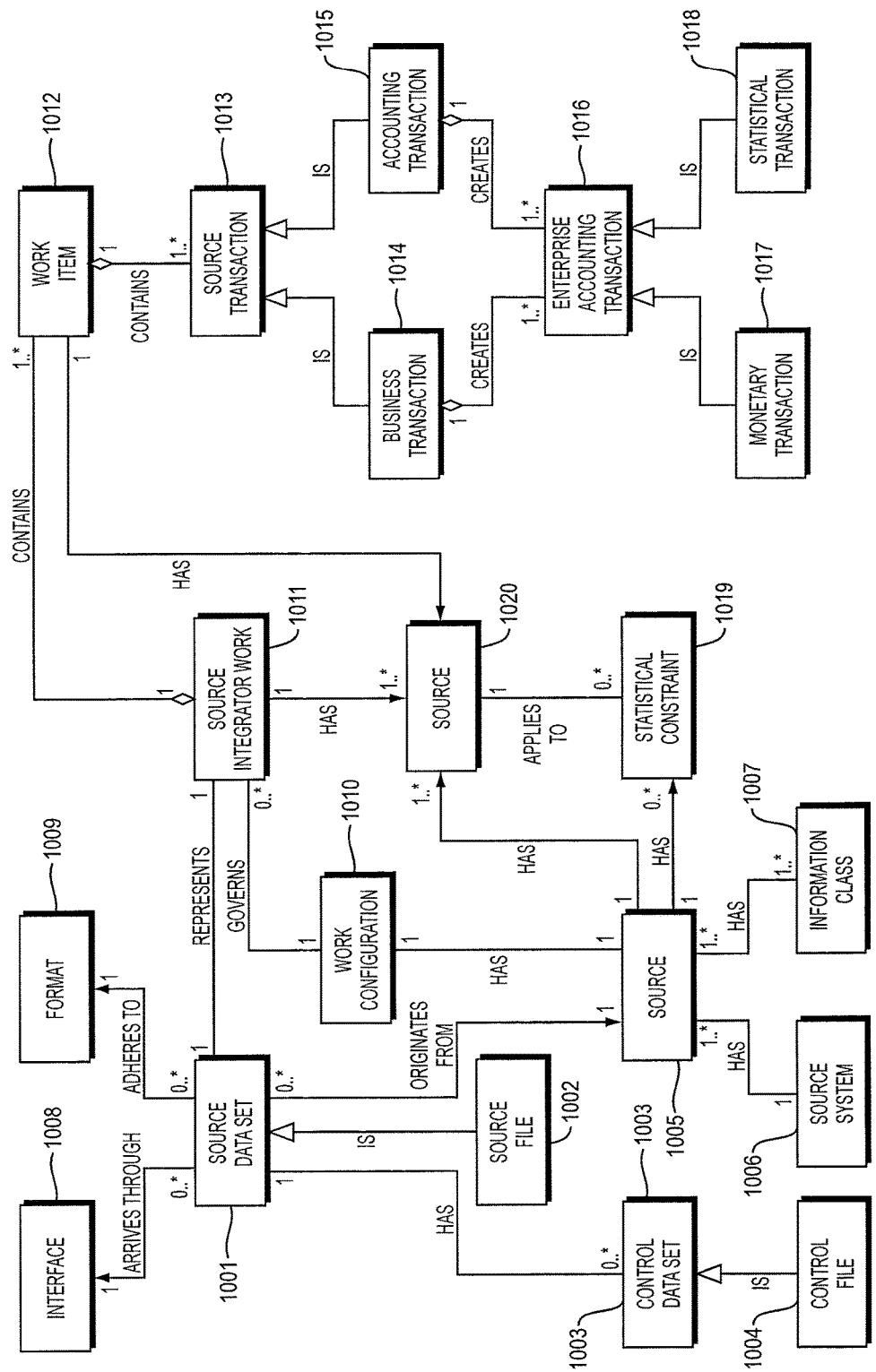
FIG. 10 is a conceptual data model for work management performed in connection with an embodiment of the present invention.

FIG. 10 depicts the conceptual data model for work management in the Source Integrator 301. A source data set 1001 is a set of related business transactions. A source file 1002 is a source data set in the form of a file. A control data set 1003 is a set of data used to verify the integrity of a source data set. A control file 1004 is a control data set in the form of a file. A source 1005 is the origin of a source data set, comprised of a source system 1006 and an information class 1007. A source system 1006 is the information system from which information originates. An information class 1007 is a high level class used to group lower level classes of business transactions. An interface 1008 is the information channel through which source data sets are received. A format 1009 describes the guidelines by which a data in a source data set 1001 can be mapped to internal representations. A work configuration 1010 is information required by the other components to process the work and related work items. Source integrator work 1011 is a unit of work that represents an incoming source data set 1001 and related control data set 1003. It is the internal representation of data for processing. A work item 1012 is a subset of data in the source integrator work class 1011. It permits the system to break data down into smaller batches for performance manageability. A source transaction 1013 is a discrete transaction from the source system 304. A business transaction 1014 is a source transaction 1013 representing aspects of a business event.

The systems and methods described herein can be used in connection with processing data related to any sort of business event. In one exemplary embodiment, related to accounting transactions that occur within an insurance company, the business event can be a premium payment, a claim payout or a pay day. In these examples, upon BRE 303 processing the data related to the business event, one or more accounting transactions are generated (output transactions), which are then reflected back in the appropriate target system(s).

In the exemplary embodiment in which the system is configured to handle accounting transactions, an accounting transaction 1015 is a source transaction in the form of credits and/or debits. An enterprise accounting transaction 1016 is a standardized enterprise accounting credit or debit. A monetary transaction 1017 is an enterprise accounting transaction 1016 that represents monetary exchange. A statistical transaction 1018 is an enterprise accounting transaction 1016 that represents a statistical measure. A statistic is a metric used to measure processing of source integrator work 1011 and work items 1012, and to measure the overall processing of data for a source 1005. A statistical constraint 1019 is a constraint applied to a statistic 1020 to determine viability of the processed source integrator work 1011.

The particular example now presented involves a claims payment process employed within an insurance company. It will be noted that this example is used for illustration purposes only. Other non-insurance, non-financial transaction embodiments are within the scope of the present invention.

Source Integrator 301 is programmed to watch the file system(s) (e.g., source system 304) for files with specific filename patterns—e.g., the filename pattern matches a regular expression (i.e., a specific pattern that provides concise and flexible means to specify and recognize strings of text, such as particular characters, words, or patterns of characters). For example, if a payment made to a policy holder may be represented by data with a file name that includes the initials of the system that made the payment and a string of numbers representing the date a payment was made.

While in the illustrative embodiment the Source Integrator 301 is programmed to watch the file system(s) for a filename pattern, in other embodiments, within the scope of the present invention, the Source Integrator 301 can be programmed to look for any other key indicator. For example, channels dedicated to specific transaction types can be monitored by the Source Integrator 301. In these embodiments, the Source Integrator 301 would be programmed to know that transactions coming through on a particular message queue would be associated with a particular transaction type.

When a file appears in the file system, Source Integrator 301 reads the file in and maps the data contained in the file to an object model (i.e., an internal representation of the transaction) based on the filename pattern. Thus, in one example, by way of illustration, the pattern ^rps_.\d{8}_\d{6}$ represents a repetitive payment, such as an annuity payment. A file arrives with the name "rps_20121230_153025". The Source Integrator 301 matches the filename to the pattern and then maps the data to an object model of RepetitivePayment, which has properties such as Amount, Frequency, and Date, by way of example. The object model is used to author and apply the business rules. A batch of financial transaction objects is thus created, each object representing a single financial transaction, e.g., a claims payment, an annuity payment etc. These financial transaction objects are then written to the Transaction Rules In message queue within the Source Integrator 301 where they wait for the BRE 303 to pick them up.

The BRE 303 listens for transaction objects on the Transaction Rules In message queue. When transactions appear in the queue, the BRE 303 uses the transaction object type to determine which set of business rules applies (business rules being authored using BRMS 302, as described above). The BRE 303 then processes the financial transaction objects against the appropriate set of business rules and produces one or more output transactions (e.g., in this example, accounting transaction objects, such as a credit or a debit). The BRE 303 then writes the output transaction objects to the Transaction Rules Out message queue, where they wait for the Source Integrator 301 to pick them up. For example, a single claims payment (financial transaction), upon being processed by BRE 303, my produce two credit accounting transactions and two debit accounting transactions. The Source Integrator 301 listens for transaction object(s) on the Transaction Rules Out message queue. When transaction objects appear, it matches them up to the original financial transaction object, based on a transaction identifier (i.e., in one embodiment, all incoming transactions are tagged with an identifier) and, again, based on the original filename pattern, chooses the appropriate target system(s) 305 (i.e., the Source Integrator 301 is configured to relate a filename pattern to a source system). The Source Integrator 301 stages both the financial and accounting transaction objects in a database for distribution to the target system(s) 305. Once staged, Source Integrator 301 validates data integrity and then sends these transactions to the downstream system(s) (e.g., in an accounting-related example, the General Ledger) and to an operational datastore (e.g., Remote Filesystem 107 of FIG. 2) for system reporting and auditing.

Figure 11:
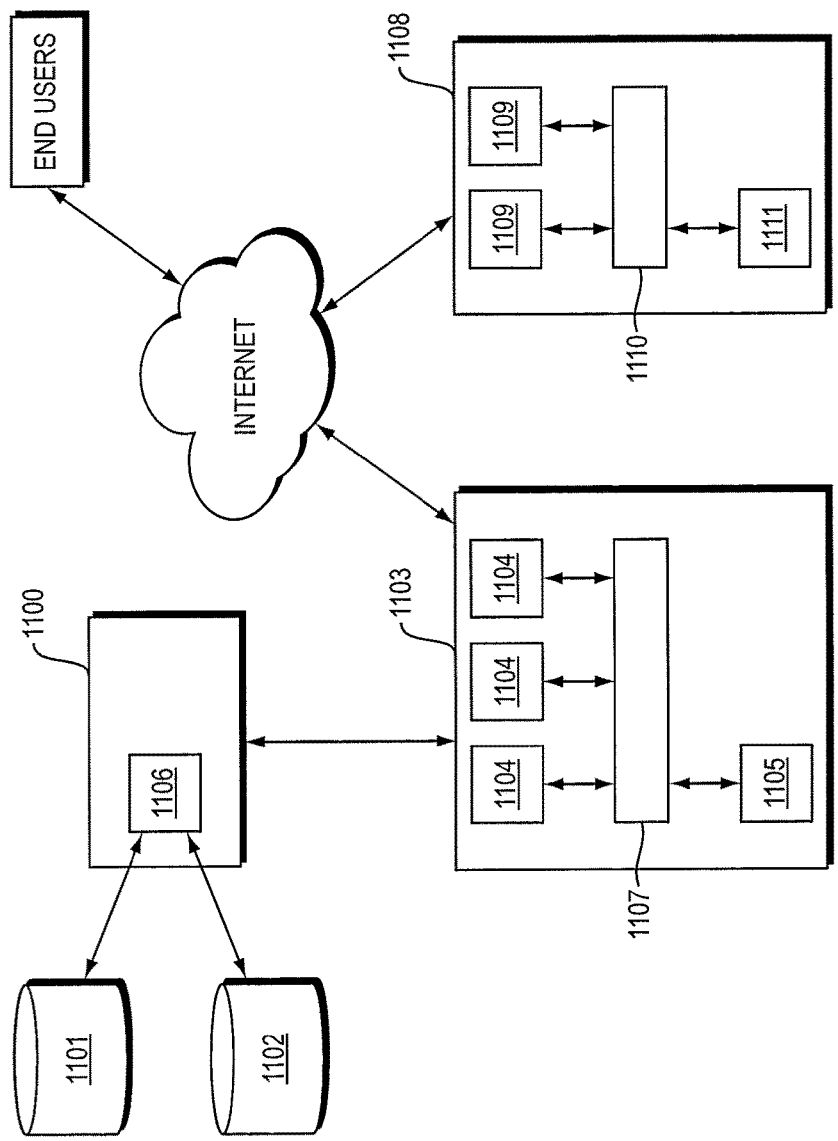
FIG. 11 is an exemplary system that may be used for carrying out the methods of the present invention.

Exemplary hardware and software that may be employed in connection with the systems discussed herein are now generally described with reference to FIG. 11. Database server(s) 1100 may include a database services management application 1106 that manages storage and retrieval of data from the database(s) 1101, 1102 (e.g., associated with one or more of source systems 304 or target system(s) 305). The databases may be relational databases; however, other data organizational structure may be used without departing from the scope of the present invention. One or more application server(s) 1103 are in communication with the database server 1100. The application server 1103 communicates requests for data to the database server 1100. The database server 1100 retrieves the requested data. The application server 1103 may also send data to the database server for storage in the database(s) 1101, 1102. The application server 1103 comprises one or more processors 1104, computer readable storage media 1105 that store programs (computer readable instructions) for execution by the processor(s), and an interface 1107 between the processor(s) 1104 and computer readable storage media 1105. The application server may store the computer programs referred to herein. For example, application server 1103 may house one or more of Source Integrator 201, BRMS 302 and BRE 303.

To the extent data and information is communicated over the Internet or an Intranet (e.g., by user 300), one or more Internet servers 1108 may be employed. The Internet server 1108 also comprises one or more processors 1109, computer readable storage media 1111 that store programs (computer readable instructions) for execution by the processor(s) 1109, and an interface 1110 between the processor(s) 1109 and computer readable storage media 1111. The Internet server 1108 is employed to deliver content that can be accessed through the communications network, e.g., by an end user. When data is requested through an application, such as an Internet browser, the Internet server 1108 receives and processes the request. The Internet server 1108 sends the data or application requested along with user interface instructions for displaying a user interface.

The computers referenced herein are specially programmed, in accordance with the described algorithms, to perform the functionality described herein.

The non-transitory computer readable storage media that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

Figure 12:
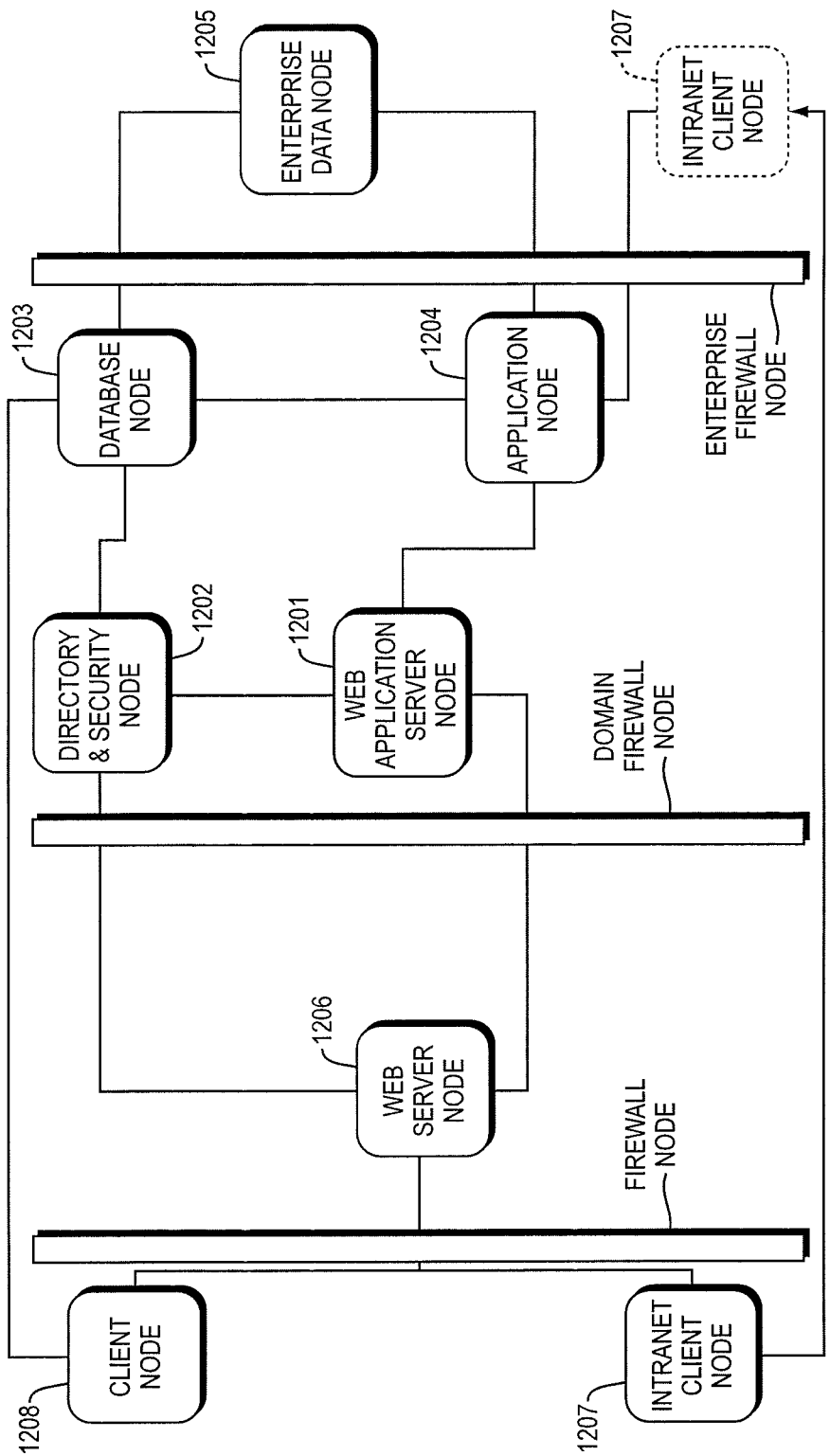
FIG. 12 is a logical operation design diagram for certain of the subsystems used in connection with an embodiment of the present invention.

By way of more specific description, FIG. 12 is a diagram illustrating the logical operation of the BRE 303, in an exemplary embodiment. The web application server node 1201 allows the user to access and initiate transactions across the web. The directory and security node 1202 is the user repository against which authentication is validated. The purpose of the database node 1203 is to store and provide access to the data required for the operation of the business rules processing service. The application node 1204 encompasses three application functionalities: for the BRMS 302, it provides the user interface to the application, and publishes rules to the rules engine for processing; for the BRE 303, it performs the rules processing; and for the Source Integrator 301, it transports data from the BRE 303 to the back end systems/target systems 305. The enterprise data node 1205 represents the data stores for the enterprise's back end systems. Data sources include operational databases, historical data and information from existing corporate environment and line of business applications. Data may reside on many different platforms and can contain structured information, such as tables or spreadsheets, or unstructured information. Web server node 1206 is the Web server for the application with an application server plug-in to maintain session affinity to an application server. The purpose of the plug-in is to provide communication between the web server node 1206 and the web application server node 1201. Intranet client node(s) 1207 provides access to the application through an internal (e.g., intranet) client via a web-browser through the enterprise network. Client node 1208 is a client that is not browser based.

Figure 13:
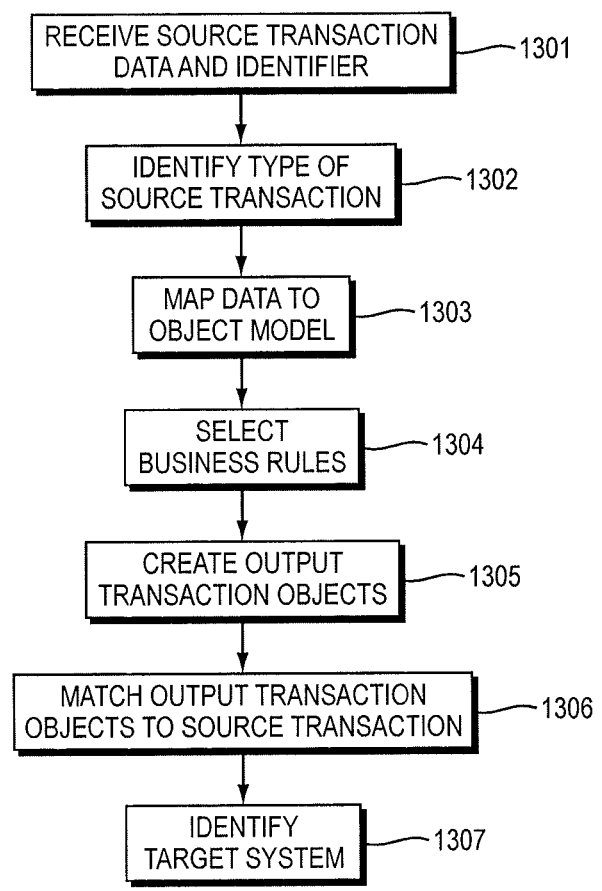
FIG. 13 is a flow chart illustrating an exemplary method of the present invention.

With reference to FIG. 13, a flow chart is shown, illustrating an exemplary method of the present invention. A data file containing data describing a source transaction, and associated with an identifier, is received in step 1301. A type of the source transaction is identified based on a key indicator associated with the data file, in step 1302. The data contained in the data file is mapped to an object model based on the type of the source transaction identified, in step 1303. Business rules are selected based on a type of the object model, in step 1304. Output transaction objects are created by processing the data contained in the data file, mapped to the object model, using business rules, in step 1305. The output transaction objects are received and matched to the source transaction, in step 1306. A target system to receive the output transaction objects is identified based on the identifier associated with the data file, in step 1307.

What is claimed is:

1. A computer implemented method comprising:
   receiving, at an integration device, a data file containing data describing a source transaction and associated with an identifier;
   identifying, at the integration device, a type of the source transaction based on a key indicator associated with the data file;
   mapping, at the integration device, the data contained in the data file to an object model based on the type of the source transaction and creating one or more input transaction objects, the one or more input transaction objects including i) the data contained in the data file and ii) data representative of the type of the object model;
   transmitting, at the integration device, the one or more input transaction objects to a business rules processing device;
   receiving, at the integration device, one or more output transaction objects from the business rules processing device, wherein the output transaction objects are created at the business rules processing device by processing the data contained in the data file, mapped to the object model, using one or more business rules, wherein the one or more business rules are authored by analysts, the one or more business rules being selected based on the data representative of a type of the object model provided in the one or more input transaction objects received from the integration device, wherein the business rules are configured to process the data contained in the data file and translate the data contained in the data file to a data format acceptable to the target system;
   matching, at the integration device, the received output transaction objects to the source transaction;
   identifying, at the integration device, a target system to receive the received output transaction objects based on the identifier associated with the data file; and
   distributing, at the integration device, the output transaction objects to the target system,
   wherein the one or more business rules are authored by analysts at a business rules management device, wherein the business rules management device deploys the business rules to the business rules processing device.

2. The method of claim 1 wherein the key indicator comprises a filename pattern.

3. The method of claim 1 wherein the key indicator is associated with a channel through which the data describing the transaction is transmitted.

4. A non-transitory computer-readable storage medium that stores instructions which, when executed by one or more processors, cause the one or more processors to perform a method comprising:
   receiving, at an integration device, a data file containing data describing a source transaction and associated with an identifier;
   identifying, at the integration device, a type of the source transaction based on a key indicator associated with the data file;
   mapping, at the integration device, the data contained in the data file to an object model based on the type of the source transaction and creating one or more input transaction objects, the one or more input transaction objects including i) the data contained in the data file and ii) data representative of the type of object model;
   transmitting, at the integration device, the one or more input transaction objects to a business rules processing device;
   receiving, at the integration device, one or more output transaction objects from the business rules processing device, wherein the output transaction objects are created at the business rules processing device by processing the data contained in the data file, mapped to the object model, using one or more business rules, wherein the one or more business rules are authored by analysts, the one or more business rules being selected based on the data representative of the type of the object model provided in the one or more input transaction objects received from the integration device, wherein the business rules are configured to process the data contained in the data file and translate the data contained in the data file to a data format acceptable to the target system;
   matching, at the integration device, the received output transaction objects to the source transaction;
   identifying, at the integration device, a target system to receive the received output transaction objects based on the identifier associated with the data file; and
   distributing, at the integration device, the output transaction objects to the target system, wherein the one or more business rules are authored by analysts at a business rules management device, wherein the business rules management device deploys the business rules to the business rules processing device.

5. The non-transitory computer-readable storage medium of claim 4 wherein the key indicator comprises a filename pattern.

6. The non-transitory computer-readable storage medium of claim 4 wherein the key indicator is associated with a channel through which the data describing the transaction is transmitted.

7. A system comprising:
   memory operable to store at least one program; and at least one processor communicatively coupled to the memory, in which the at least one program, when executed by the at least one processor, causes the at least one processor to:
- receive, at an integration device, a data file containing data describing a source transaction and associated with an identifier;
- identify, at the integration device, a type of the source transaction based on a key indicator associated with the data file;
- map, at the integration device, the data contained in the data file to an object model based on the type of the source transaction and create one or more input transaction objects, the one or more input transaction objects including i) the data contained in the data file and ii) data representative of the type of the object model;
- transmit, at the integration device, the one or more input transaction objects to a business rules processing device;
- receive, at the integration device, one or more output transaction objects from the business rules processing device, wherein the output transaction objects are created at the business rules processing device by processing the data contained in the data file, mapped to the object model, using one or more business rules, wherein the one or more business rules are authored by analysts, the one or more business rules being selected based on the data representative of the type of the object model provided in the one or more input transaction objects received from the integration device, wherein the business rules are configured to process the data contained in the data file and translate the data contained in the data file to a data format acceptable to the target system;
- match, at the integration device, the received output transaction objects to the source transaction;
- identify, at the integration device, a target system to receive the received output transaction objects based on the identifier associated with the data file; and
- distributing, at the integration device, the output transaction objects to the target system,
- wherein the one or more business rules are authored by analysts at a business rules management device, wherein the business rules management device deploys the business rules to the business rules processing device.

8. The system of claim 7 wherein the key indicator comprises a filename pattern.

9. The system of claim 7 wherein the key indicator is associated with a channel through which the data describing the transaction is transmitted.

\* \* \* \* \*